(12) United States Patent
Kulp

(10) Patent No.: US 7,414,080 B2
(45) Date of Patent: Aug. 19, 2008

(54) POLYURETHANE POLISHING PAD

(75) Inventor: Mary Jo Kulp, Newark, DE (US)

(73) Assignee: Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 11/036,285

(22) Filed: Jan. 13, 2005

(65) Prior Publication Data

US 2005/0171225 A1 Aug. 4, 2005

Related U.S. Application Data

(63) Continuation-in-part of application No. 10/772,054, filed on Feb. 3, 2004, now abandoned.

(51) Int. Cl.
*C08G 18/10* (2006.01)
(52) U.S. Cl. .................. 521/159; 451/526; 451/540; 521/137; 521/163; 521/167; 521/170; 521/172; 521/173; 521/174; 521/176
(58) Field of Classification Search ............... 521/159, 521/163, 167, 170, 172, 173, 174, 176, 137; 451/526, 540
See application file for complete search history.

(56) References Cited

U.S. PATENT DOCUMENTS

| | | | | |
|---|---|---|---|---|
| 6,022,268 | A * | 2/2000 | Roberts et al. | 451/548 |
| 6,221,929 | B1 * | 4/2001 | Ryugo et al. | 521/114 |
| 6,239,188 | B1 * | 5/2001 | Kihara et al. | 521/159 |
| 6,627,671 | B1 * | 9/2003 | Kihara et al. | 521/159 |
| 6,777,455 | B2 * | 8/2004 | Seyanagi et al. | 521/110 |
| 6,835,793 | B2 * | 12/2004 | Yokota et al. | 528/63 |
| 2001/0050268 | A1 * | 12/2001 | Reinhardt | 216/89 |
| 2002/0183409 | A1 * | 12/2002 | Seyanagi et al. | 521/155 |
| 2003/0069321 | A1 * | 4/2003 | Lin et al. | 521/159 |
| 2003/0148722 | A1 | 8/2003 | Lombardo et al. | |
| 2004/0021243 | A1 * | 2/2004 | Shih et al. | 264/51 |

FOREIGN PATENT DOCUMENTS

| | | |
|---|---|---|
| EP | 1 354 913 A1 | 10/2003 |
| EP | 1 522 385 A2 | 4/2005 |
| WO | WO 01/91971 A1 * | 12/2001 |
| WO | WO 03/066703 A1 | 8/2003 |

OTHER PUBLICATIONS

Uniroyal Chemical: "Adiprene LF 750D", Product Data, Jul. 1996, XP002325260.
Crompton, Material Safety Data Sheet, Product Name: Adiprene® LFG-963A, Revision:1.2; Jun. 13, 2003, pp. 1-7.
Chemtura, Material Safety Data Sheet, Product Name: Adiprene® L 325; Version 1.0; Date of Issue: Jun. 30, 2005; Date printed; Nov. 15, 2005, pp. 1-9.
Crompton, Material Safety Data Sheet, Product Name: Adiprene® LF 600D; MSDS No. V752154; Date Issued Apr. 27, 1992; Date Revised: May 13, 1997; Superceded Apr. 15, 1994.
Crompton, Material Safety Data Sheet, Product Name: Adiprene® LF 700D; MSDS No. V752155; Date Issued: Mar. 15, 1991; Date Revised: May 13, 1997; Supercedes: Apr. 15, 1994.
Uniroyal Chemical, Material Safety Data Sheet; Product Name: Adiprene® LF 751D; MSDS No. V752043; Date Issued: Sep. 11, 1992; Date Revised: May 13, 1997; Supercedes: Apr. 15, 1994.
Crompton, Material Safety Data Sheet; Product Name: Adiprene® LF 950A; MSDS No. V 752041; Date Issued: Nov. 20, 1991; Date Revised: May 13, 1997; Superceded: Apr. 15, 1994.
Crompton, Material Safety Data Sheet; Product Name: Adiprene® LF 1950A; Revision 1.5; May 28, 2003, pp. 1-7.

* cited by examiner

*Primary Examiner*—John Cooney
(74) *Attorney, Agent, or Firm*—Blake T. Biederman

(57) ABSTRACT

The polishing pad is suitable for planarizing at least one of semiconductor, optical and magnetic substrates. The polishing pad includes a cast polyurethane polymeric material formed with an isocyanate-terminated reaction product formed from a prepolymer reaction of a prepolymer polyol and a polyfunctional isocyanate. The isocyanate-terminated section product has 4.5 to 8.7 weight percent unreacted NCO; and the isocyanate-terminated reaction product is cured with a curative agent selected from the group comprising curative polyamines, curative polyols, curative alcoholamines and mixtures thereof. The polishing pad contains at least 0.1 volume percent filler or porosity.

6 Claims, No Drawings

POLYURETHANE POLISHING PAD

CROSS REFERENCE TO RELATED APPLICATION

This application is a continuation-in-part of pending application U.S. Ser. No. 10/772,054, filed Feb. 3, 2004, now abandoned.

BACKGROUND

This specification relates to polishing pads useful for polishing and planarizing substrates and particularly to polishing pads having uniform polishing properties.

Polyurethane polishing pads are the primary pad-type for a variety of demanding precision polishing applications. These polyurethane polishing pads are effective for polishing silicon wafers, patterned wafers, flat panel displays and magnetic storage disks. In particular, polyurethane polishing pads provide the mechanical integrity and chemical resistance for most polishing operations used to fabricate integrated circuits. For example, polyurethane polishing pads have high strength for resisting tearing; abrasion resistance for avoiding wear problems during polishing; and stability for resisting attack by strong acidic and strong caustic polishing solutions.

The production of semiconductors typically involves several chemical mechanical planarization (CMP) processes. In each CMP process, a polishing pad in combination with a polishing solution, such as an abrasive-containing polishing slurry or an abrasive-free reactive liquid, removes excess material in a manner that planarizes or maintains flatness for receipt of a subsequent layer. The stacking of these layers combines in a manner that forms an integrated circuit. The fabrication of these semiconductor devices continues to become more complex due to requirements for devices with higher operating speeds, lower leakage currents and reduced power consumption. In terms of device architecture, this translates to finer feature geometries and increased metallization levels. These increasingly stringent device design requirements are driving the adoption of copper metallization in conjunction with new dielectric materials having lower dielectric constants. The diminished physical properties, frequently associated with low k and ultra-low k materials, in combination with the devices' increased complexity have led to greater demands on CMP consumables, such as polishing pads and polishing solutions.

In particular, low k and ultra-low k dielectrics tend to have lower mechanical strength and poorer adhesion in comparison to conventional dielectrics, rendering planarization more difficult. In addition, as integrated circuits' feature sizes decrease, CMP-induced defectivity, such as, scratching becomes a greater issue. Furthermore, integrated circuits' decreasing film thickness requires improvements in defectivity while simultaneously providing acceptable topography to a wafer substrate—these topography requirements demand increasingly stringent planarity, dishing and erosion specifications.

Casting polyurethane into cakes and cutting the cakes into several thin polishing pads has proven to be an effective method for manufacturing polishing pads with consistent reproducible polishing properties. Vishwanathan et al., in PCT Pub. No. 01.91971 disclose a set of properties for improving polishing performance including E' (elastic storage modulus) ratio at 30° C. and 90° C. and several other properties. Unfortunately, polyurethane pads produced from the casting and skiving method can have polishing variations arising from a polishing pad's casting location. For example, pads cut from a bottom casting location and a top casting can have different densities and porosities. Furthermore, polishing pads can have center-to-edge variations in density and porosity within a pad. These variations can adversely affect polishing for the most demanding applications, such as low k patterned wafers. Thus, there is a demand for a polyurethane polishing pad with improved density and porosity uniformity.

STATEMENT OF INVENTION

The invention provides a polishing pad suitable for planarizing at least one of semiconductor, optical and magnetic substrates, the polishing pad comprising a cast polyurethane polymeric material formed from a prepolymer reaction of a prepolymer polyol and a polyfunctional aromatic isocyanate to form an isocyanate-terminated reaction product, the polyfunctional aromatic isocyanate having less than 8 weight percent aliphatic isocyanate and the isocyanate-terminated reaction product having 4.5 to 8.7 weight percent unreacted NCO, the isocyanate-terminated reaction product being cured with a curative agent selected from the group comprising curative polyamines, curative polyols, curative alcoholamines and mixtures thereof; and the polishing pad containing at least 0.1 volume percent filler or porosity.

In another aspect of the invention, the invention provides a polishing pad suitable for planarizing semiconductor substrates, the polishing pad comprising a cast polyurethane polymeric material formed from a prepolymer reaction of a prepolymer polyol selected from the group comprising polytetramethylene ether glycol, polyester polyols, polypropylene ether glycols, copolymers thereof and mixtures thereof and a polyfunctional aromatic isocyanate to form an isocyanate-terminated reaction product, the polyfunctional aromatic isocyanate having less than 5 weight percent aliphatic isocyanate and the isocyanate-terminated reaction product having 4.5 to 8.7 weight percent unreacted NCO, the isocyanate-terminated reaction product being cured with a curative agent with expandable polymeric microspheres, the curative agent selected from the group comprising curative polyamines, curative polyols, curative alcoholamines and mixtures thereof; and the polishing pad containing a porosity of at least 0.1 volume percent.

In another aspect of the invention, the invention provides a method of forming a polishing pad suitable for planarizing semiconductor substrates comprising casting polyurethane polymeric material from a prepolymer reaction of a prepolymer polyol and a polyfunctional aromatic isocyanate to form an isocyanate-terminated reaction product, the polyfunctional aromatic isocyanate having less than 8 weight percent aliphatic isocyanate and the isocyanate-terminated reaction product having 4.5 to 8.7 weight percent unreacted NCO, the isocyanate-terminated reaction product being cured with a curative agent selected from the group comprising curative polyamines, curative polyols, curative alcoholamines and mixtures thereof; and the polishing pad containing at least 0.1 volume percent filler or porosity.

DETAILED DESCRIPTION

Cast polyurethane polishing pads are suitable for planarizing semiconductor, optical and magnetic substrates. The pads' particular polishing properties arise in part from a prepolymer reaction product of a prepolymer polyol and a polyfunctional isocyanate. The prepolymer product is cured with a curative agent selected from the group comprising curative polyamines, curative polyols, curative alcohol amines and mixtures thereof to form a polishing pad. It has been discovered that controlling the amount of unreacted NCO in the prepolymer reaction product can improve porous pads' uniformity throughout a polyurethane casting.

In particular, controlling the prepolymer's weight percent unreacted NCO, appears to limit the exotherm from the chain extension reaction. This limits the temperature increase within the cast material and can improve the uniformity of density across pads and through the "as cast" cakes. The lower pad uniformity of earlier cast polyurethane polishing pads arises from the high weight percent NCO of Adiprene L325 (Adiprene® is a urethane prepolymer product of Crompton/Uniroyal Chemical) used to produce IC™ pads from Rohm and Haas Electronic Materials CMP Technologies. But because a large part of the available NCO in Adiprene L325 is the less reactive aliphatic 4,4'-dicyclohexylmethane diisocyanate rather than all TDI, the exotherm is not as large as it would be with an all aromatic isocyanate system. Controlling the prepolymer reaction product's reactive weight percent NCO improves the temperature uniformity during the manufacturing process by controlling the exothermic heat of reaction. If the weight percent NCO is too high, then the polishing pad can overheat in the middle and top portions, especially for polishing pads skived from cast polyurethane cakes. If the weight percent NCO is too low, then the polyurethane will have too long of a gel time that can also lead to non-uniformity, such as, the sinking of high-density particles or floating of low-density particles and pores during an extended gelation process. Controlling the prepolymer's weight percent unreated NCO to between 4.5 and 8.7 weight percent provides cast polyurethane polishing pads with uniform properties. Preferably, the prepolymer's weight percent unreacted NCO is between 4.7 and 8.5.

The polymer is effective for forming porous and filled polishing pads. For purposes of this specification, filler for polishing pads include solid particles that dislodge or dissolve during polishing, and liquid-filled particles or spheres. For purposes of this specification, porosity includes gas-filled particles, gas-filled spheres and voids formed from other means, such as mechanically frothing gas into a viscous system, injecting gas into the polyurethane melt, introducing gas in situ using a chemical reaction with gaseous product, or decreasing pressure to cause disolved gas to form bubbles. The polishing pads contain a porosity or filler concentration of at least 0.1 volume percent. This porosity or filler contributes to the polishing pad's ability to transfer polishing fluids during polishing. Preferably, the polishing pad has a porosity or filler concentration of 0.2 to 70 volume percent. Most preferably, the polishing pad has a porosity or filler concentration of 0.25 to 60 volume percent. Preferably the pores or filler particles have a weight average diameter of 10 to 100 μm. Most preferably, the pores or filler particles have a weight average diameter of 15 to 90 μm. The nominal range of expanded hollow-polymeric microspheres' weight average diameters is 15 to 50 μm.

Controlling the unreacted NCO concentration is particularly effective for controlling the pore uniformity for pores formed directly or indirectly with a filler gas. This is because gases tend to undergo thermal expansion at a much greater rate and to a greater extent than solids and liquids. For example, the method is particularly effective for porosity formed by casting hollow microspheres, either pre-expanded or expanded in situ; by using chemical foaming agents; by mechanically frothing in gas; and by use of dissolved gases, such as argon, carbon dioxide, helium, nitrogen, and air, or supercritical fluids, such as supercritical carbon dioxide or gases formed in situ as a reaction product.

For polishing pads containing gaseous pores or gaseous-filled microspheres, a polishing pad's non-uniformity appears to be driven by the following: 1) the temperature profile of the reacting system; 2) the resulting pore expansion in areas where the temperature increases above that of the expansion temperature of the pore while the surrounding polymeric matrix remains not-so-locked in place as to be able to respond; and 3) the viscosity profile of the reacting or solidifying polymer matrix as a result of reaction and various local heating and cooling effects. In the case of a pore added through polymeric hollow microspheres, their Tg is related to the threshhold temperature for response. Polymeric microspheres above this temperature tend to grow and deform in shape. When casting with hollow polymeric microspheres and with the controlled weight percent unreacted NCO, the microspheres' pre-casting volume and the microspheres' final volume preferably remains within 8 percent of the average pre-casting volume throughout the cast polyurethane material. Most preferably, the microspheres' final volume remains within 7 percent of the pre-casting volume throughout the cast polyurethane material.

Literature shows a volume decrease as a function of time for pre-expanded Expancel microspheres maintained at elevated temperatures. However, the further expansion of the expanded microspheres contributes to increased non-uniformity of the polishing pads. By controlling the thermal history in the casting process by limiting weight percent unreacted NCO, polishing pads with more uniform density throughout both individual pads and the cake are produced. Pad formulations with more uniform density can provide more consistent removal rates and topographical control than pad formulations where this is uncontrolled, giving greater CMP process control in actual use.

With Adiprene L325 prepolymers, peak exotherm temperatures reach as high as 264° F. (129° C.). These temperatures are well above the expansion onset temperature and closely approach the temperatures of maximum expansion for Expancel microsphere 551DU40—the unexpanded microspheres from which 551DE40d42 is produced—275-289° F. (135-143° C.). Typically, the density in the center of the cast cake is lower due to greater heating and the resulting greater pore expansion. Polishing pads' porosity variation also tends to increase with increasing initial pore volume, increasing material temperatures and increasing mass of cast material.

Because the pore can only expand if the surrounding polymer is still sufficiently mobile that it can rearrange with a small pressure, it is also important that the weight percent unreacted NCO of the system and the ability of the polymer backbone to order is not too low, or the pores or filler can slowly expand or segregate by density, yielding a broader density distribution.

Preferably, the polymeric material is a polyurethane. For purposes of this specification, "polyurethanes" are products derived from difunctional or polyfunctional isocyanates, e.g. polyetherureas, polyesterureas, polyisocyanurates, polyurethanes, polyureas, polyurethaneureas, copolymers thereof and mixtures thereof. An approach for controlling a pad's polishing properties is to alter its chemical composition. In addition, the choice of raw materials and manufacturing process affects the polymer morphology and the final properties of the material used to make polishing pads.

Preferably, urethane production involves the preparation of an isocyanate-terminated urethane prepolymer from a polyfunctional aromatic isocyanate and a prepolymer polyol. For purposes of this specification, the term prepolymer polyol includes diols, polyols, polyol-diols, copolymers thereof and mixtures thereof. Preferably, the prepolymer polyol is selected from the group comprising polytetramethylene ether glycol [PTMEG], polypropylene ether glycol [PPG], ester-based polyols, such as ethylene or butylene adipates, copolymers thereof and mixtures thereof. Example polyfunctional aromatic isocyanates include 2,4-toluene diisocyanate, 2,6-toluene diisocyanate, 4,4'-diphenylmethane diisocyanate, naphthalene-1,5-diisocyanate, tolidine diisocyanate, para-phenylene diisocyanate, xylylene diisocyanate and mixtures thereof. The polyfunctional aromatic isocyanate contains less than 8 weight percent aliphatic isocyanates, such as 4,4'-dicyclohexylmethane diisocyanate, isophorone diisocyanate and cyclohexanediisocyanate. Typically, aliphatic isocyanates are less reactive than aromatic isocyanates and release heat into the system more gradually. Preferably, the polyfunctional aromatic isocyanate contains less than 5 weight percent aliphatic isocyanates and more preferably, less than 1 weight percent aliphatic isocyanate.

Example prepolymer polyols include polyether polyols, such as, poly(oxytetramethylene)glycol, poly(oxypropylene) glycol and mixtures thereof, polycarbonate polyols, polyester polyols, polycaprolactone polyols and mixtures thereof. Example polyols can be mixed with low molecular weight polyols, including ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol and mixtures thereof.

Preferably the prepolymer polyol is selected from the group comprising polytetramethylene ether glycol, polyester polyols, polypropylene ether glycols, polycaprolactone polyols, copolymers thereof and mixtures thereof. If the prepolymer polyol is PTMEG, copolymer thereof or a mixture thereof, then the isocyanate-terminated reaction product most preferably has a weight percent unreacted NCO range of 5.8 to 8.7. Particular examples of PTMEG family polyols are as follows: Terathane® 2900, 2000, 1800, 1400, 1000, 650 and 250 from DuPont; Polymeg® 2000, 1000, 1500, 650 from Lyondell; PolyTHF® 650, 1000, 1800, 2000 from BASF, and lower molecular weight species such as 1,2-butanediol, 1,3-butanediol, and 1,4-butanediol. If the prepolymer polyol is a PPG, copolymer thereof or a mixture thereof, then the isocyanate-terminated reaction product most preferably has a weight percent unreacted NCO range of 5 to 8. Particular examples of PPG polyols are as follows: Arcol® PPG-425, 725, 1000, 1025, 2000, 2025, 3025 and 4000 from Bayer; Voranol® 220-028, 220-094, 220-110N, 220-260, 222-029, 222-056, 230-056 from Dow; Desmophen® 1110BD, Acclaim® Polyol 4200 both from Bayer If the prepolymer polyol is an ester, copolymer thereof or a mixture thereof, then the isocyanate-terminated reaction product most preferably has a weight percent unreacted NCO range of 4.5 to 7. Particular examples of ester polyols are as follows: Millester 1, 11, 2, 23, 132, 231, 272, 4, 5, 510, 51, 7, 8, 9, 10, 16, 253, from Polyurethane Specialties Company, Inc.; Desmophen® 1700, 1800, 2000, 2001KS, 2001K$^2$, 2500, 2501, 2505, 2601, PE65B from Bayer; Rucoflex S-1021-70, S-1043-46, S-1043-55 from Bayer.

Typically, the prepolymer reaction product is reacted or cured with a curative polyol, polyamine, alcohol amine or mixture thereof. For purposes of this specification, polyamines include diamines and other multifunctional amines. Example curative polyamines include aromatic diamines or polyamines, such as, 4,4'-methylene-bis-o-chloroaniline [MBCA], 4,4'-methylene-bis-(3-chloro-2,6-diethylaniline) [MCDEA]; dimethylthiotoluenediamine; trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate; 1,2-bis(2-aminophenylthio)ethane; 4,4'-methylene-bis-aniline; diethyltoluenediamine; 5-tert-butyl-2,4- and 3-tert-butyl-2,6-toluenediamine; 5-tert-amyl-2,4-and 3-tert-amyl-2,6-toluenediamine and chlorotoluenediamine. Optionally, it is possible to manufacture urethane polymers for polishing pads with a single mixing step that avoids the use of prepolymers.

The components of the polymer used to make the polishing pad are preferably chosen so that the resulting pad morphology is stable and easily reproducible. For example, when mixing 4,4'-methylene-bis-o-chloroaniline [MBCA] with diisocyanate to form polyurethane polymers, it is often advantageous to control levels of monoamine, diamine and triamine. Controlling the proportion of mono-, di- and tri-amines contributes to maintaining the cross-linking within a consistent range. In addition, it is often important to control additives such as anti-oxidizing agents, and impurities such as water for consistent manufacturing. For example, since water reacts with isocyanate to form gaseous carbon dioxide, controlling the water concentration can affect the concentration of carbon dioxide bubbles that form pores in the polymeric matrix.

The polyurethane polymeric material is preferably formed from a prepolymer reaction product of toluene diisocyanate and polytetramethylene ether glycol with 4,4'-methylene-bis-o-chloroaniline. Preferably, the prepolymer reaction product has a 4.55 to 8.7 weight percent unreacted NCO. Examples of suitable prepolymers within this unreacted NCO range include: Airthane® prepolymers PET-70D, PHP-70D, PET-60D, PET-95A, PET-93A, PST-95A, PPT-95A, Versathane® prepolymers STE-95A, STE-P95, Versathane®-C prepolymers 1050, 1160, D-5QM, D-55, D-6 manufactured by Air Products and Chemicals, Inc. and Adiprene® prepolymers LF600D, LF601D, LF700D, LF950A, LF952A, LF939A, LFG963A, LF1930A, LF1950A, LF1600D, L167, L367 manufactured by Uniroyal Chemical Products division of the Crompton Corporation. In addition, blends of other prepolymers besides those listed above could be used to reach to appropriate %unreacted NCO levels as a result of blending. Many of the above-listed prepolymers, such as, LF600D, LF601D, LF700D, and LFG963A are low-free isocyanate prepolymers that have less than 0.1 weight percent free TDI monomer and have a more consistent prepolymer molecular weight distribution than conventional prepolymers, and so facilitate forming polishing pads with excellent polishing characteristics. This improved prepolymer molecular weight consistency and low free isocyanate monomer give an initially lower viscosity prepolymer that tends to gel more rapidly, facilitating viscosity control that can further improve porosity distribution and polishing pad consistency. For most prepolymers, the low free isocyanate monomer is preferably below 0.5 weight percent. Furthermore, "conventional" prepolymers that typically have higher levels of reaction (i.e. more than one polyol capped by a diisocyanate on each end) and higher levels of free toluene diisocyanate prepolymer should produce similar results. In addition, low molecular weight polyol additives, such as, diethylene glycol, butanediol and tripropylene glycol facilitate control of the prepolymer reaction product's weight percent unreacted NCO.

In addition to controlling weight percent unreacted NCO, the curative and prepolymer reaction product preferably has an OH or NH$_2$ to unreacted NCO stoichiometric ratio of 80 to 120 percent; and most preferably, it has an OH or NH$_2$ to unreacted NCO stoichiometric ratio of 80 to 110 percent.

If the polishing pad is a polyurethane material, then the polishing pad preferably has a density of 0.5 to 1.25 g/cm$^3$. Most preferably, polyurethane polishing pads have a density of 0.6 to 1.15 g/cm$^3$.

EXAMPLES

The following Table provides prepolymer and microsphere formulations for casting polyurethane cakes. These formulations contained various amounts of polymeric microspheres for producing porosity with different prepolymer formulations. These formulations tested toluene diiosocyanate [TDI] with polytetramethylene ether glycol [PTMEG], polypropylene ether glycol [PPG] and ester backbones from isocyanate-terminated prepolymers. As shown in following Tables, formulations 1 to 9 represent formulations of the invention and formulations A to E represent comparative examples. In particular, comparative example A corresponds to the formulation of Example 1 of U.S. Pat. No. 5,578,362; and comparative example B corresponds to the formulation of the IC1000™ polyurethane polishing pads sold by Rohm and Haas Electronic Materials CMP Technologies. The amount of unreacted NCO contained in the isocyanate-terminated prepolymers range from 5.3 to 9.11 percent.

TABLE 1

Polishing Pad Ingredients

| Formulation | Polyol Backbone | Isocyanate ADIPRENE | Unreacted NCO Wt. % | Microsphere EXPANCEL | Microsphere Wt. % | Estimated Microsphere Density (g/cc) |
|---|---|---|---|---|---|---|
| A-1 | PTMEG | L325 | 9.11 | 551DE40d42 | 1.78 | 0.043 |
| A-2 | PTMEG | L325 | 9.11 | N/A | 0.00 | 0.043 |
| B-1 | PTMEG | L325 | 9.11 | 551DE40d42 | 1.58 | 0.043 |
| B-2 | PTMEG | L325 | 9.11 | 551DE40d42 | 2.10 | 0.043 |
| B-3 | PTMEG | L325 | 9.11 | 551DE40d42 | 1.56 | 0.043 |
| B-4 | PTMEG | L325 | 9.11 | N/A | 0.00 | 0.043 |
| B-5 | PTMEG | L325 | 9.11 | 551DE40d42 | 1.58 | 0.043 |
| C-1 | PTMEG | LF751D | 9.02 | N/A | 0.00 | 0.042 |
| C-2 | PTMEG | LF751D | 9.02 | 551DE40d42 | 0.89 | 0.042 |
| C-3 | PTMEG | LF751D | 9.02 | 551DE40d42 | 1.71 | 0.042 |
| D | PTMEG | LF600D | 7.12 | N/A | 0.00 | 0.042 |
| 1 | PTMEG | LF600D | 7.12 | 551DE40d42 | 0.88 | 0.042 |
| 2 | PTMEG | LF600D | 7.12 | 551DE40d42 | 1.75 | 0.042 |
| E | PTMEG | LF700D | 8.13 | N/A | 0.00 | 0.042 |
| 3 | PTMEG | LF700D | 8.13 | 551DE40d42 | 0.87 | 0.042 |
| 4 | PTMEG | LF700D | 8.13 | 551DE40d42 | 1.73 | 0.042 |
| 5 | PTMEG | LF600D | 7.18 | 551DE40d42 | 1.25 | 0.043 |
| 6 | PTMEG | LF950A | 5.99 | 551DE40d42 | 2.01 | 0.042 |
| 7-1 | PTMEG | LF950A | 5.99 | 551DE20d60 | 1.76 | 0.060 |
| 7-2 | PTMEG | LF950A | 5.99 | 551DE20d60 | 1.78 | 0.055 |
| 8 | PPG | LFG963A | 5.75 | 551DE40d42 | 1.25 | 0.043 |
| 9-1 | Ester | LF1950A | 5.4 | 551DE20d60 | 2.56 | 0.060 |
| 9-2 | Ester | LF1950A | 5.3 | 551DE20d60 | 2.55 | 0.061 |

Adiprene ® is a urethane prepolymer product of Crompton/Uniroyal Chemical.

L325 is a H$_{12}$MDI/TDI - PTMEG having an unreacted NCO of 8.95 to 9.25 wt %.

LF600D is a TDI - PTMEG having an unreacted NCO of 7.1 to 7.4 wt %.

LF700D is a TDI - PTMEG having an unreacted NCO of 8.1 to 8.4 wt %.

LF751D is a TDI - PTMEG having an unreacted NCO of 8.9 to 9.2 wt %.

LF950A is a TDI - PTMEG having an unreacted NCO of 5.9 to 6.2 wt %.

LFG963A is a TDI-PPG having an unreacted NCO of 5.55 to 5.85 wt %.

LF1950A is a TDI-ester having an unreacted NCO of 5.24 to 5.54 wt %.

Expancel ® 551DE40d42 is a 30-50 μm weight average diameter hollow-polymeric microsphere manufactured by Akzo Nobel Expancel ® 551DE20d60 is a 15-25 μm weight average diameter hollow-polymeric microsphere manufactured by Akzo Nobel N/A = Not Applicable The microspheres represent hollow or gas-filled polymeric spheres expanded from other Expancel® microspheres. Table 2 below provides the expansion onset and expansion maximum temperatures for the microspheres before expansion.

TABLE 2

Microsphere Expansion Temperatures

| Microsphere (Expanded) | Density Specification Range g/liter | Expanded from Microsphere | Expansion Onset T, ° F. | Expansion Onset T, ° C. | Expansion Max T, ° C. | Expansion Max T, ° C. |
|---|---|---|---|---|---|---|
| 551DE20d60 | 55 to 65 | 551DU20 | 199-210 | 93-98 | 264-279 | 129-137 |
| 551DE40d42 | 38 to 46 | 551DU40 | 199-210 | 93-98 | 275-289 | 135-143 |

The polymeric pad materials were prepared by mixing various amounts of isocyanate-terminated-urethane prepolymers with 4,4'-methylene-bis-o-chloroaniline [MBCA] at the prepolymer temperatures and MBCA temperatures provided in Table 3. At these temperatures, the urethane/polyfunctional amine mixture had a gel time on the order of 4 to 12 minutes after adding of hollow elastic polymeric microspheres to the mixture. The 551DE40d42 microspheres had a weight average diameter of 30 to 50 μm, with a range of 5 to 200 μm; and the 551DE20d60 microspheres had a weight average diameter of 15 to 25 μm, and were blended at approximately 3,600 rpm using a high shear mixer to evenly distribute the microspheres in the mixture. The final mixture was transferred to a mold and permitted to gel for about 15 minutes.

The mold was then placed in a curing oven and cured with a cycle as follows: thirty minutes ramped from ambient temperature to a set point of 104° C., fifteen and one half hours at 104° C. (except comparative examples A-1 and A-2 where this segment is changed to 5 h hours at 93° C.) and two hours with a set point reduced to 21° C. The molded article was then "skived" into thin sheets and macro-channels or grooves were machined into the surface at room temperature—skiving at higher temperatures may improve surface roughness.

TABLE 3

Casting Conditions

| Formulation | Prepolymer flow rate, kg/min | Prepolymer temperature, ° F./° C. | MBCA flow rate, g/min | MBCA temperature, ° F./° C. | Expancel flow rate, g/min | Pour time, minutes | Cake Diameter, in./cm | Cake Height, in./cm | Main oven temperature, ° F./° C. | Time at main temperature, hours |
|---|---|---|---|---|---|---|---|---|---|---|
| A-1 | 3.00 | 122/50 | 770 | 240/116 | 68.3 | 3 | 26/66 | 2/5.1 | 200/93 | 5 |
| A-2 | 3.00 | 122/50 | 770 | 240/116 | 0 | 3 | 26/66 | 1/2.5 | 200/93 | 5 |
| B-1 | 4.15 | 123/51 | 1040 | 241/116 | 83.26 | 3 | 26/66 | 2/5.1 | 220/104 | 15.5 |
| B-2 | 3.10 | 122/50 | 780 | 240/116 | 83.14 | 4 | 36/91 | 1/2.5 | 220/104 | 15.5 |
| B-3 | 5.00 | 125/52 | 1250 | 240/116 | 99.3 | 4 | 34/36 | 2/5.1 | 220/104 | 15.5 |
| B-4 | 4.15 | 123/51 | 1040 | 240/116 | 0 | 3 | 26/66 | 1.5/3.8 | 220/104 | 15.5 |
| B-5 | 4.15 | 124/51 | 1040 | 241/116 | 83.56 | 3 | 26/66 | 2/5.1 | 220/104 | 15.5 |
| C-1 | 4.61 | 127/53 | 1233 | 243/117 | 0 | 3 | 26/66 | 2/5.1 | 220/104 | 15.5 |
| C-2 | 4.62 | 126/52 | 1238 | 244/118 | 52.5 | 4 | 36/91 | 1.5/3.8 | 220/104 | 15.5 |
| C-3 | 4.61 | 128/53 | 1230 | 243/117 | 101.5 | 4 | 36/91 | 1.5/3.8 | 220/104 | 15.5 |
| D | 4.63 | 126/52 | 989 | 244/118 | 0 | 3 | 26/66 | 2/5.1 | 220/104 | 15.5 |
| 1 | 4.63 | 127/53 | 999 | 245/118 | 50 | 4 | 36/91 | 1.5/3.8 | 220/104 | 15.5 |
| 2 | 4.62 | 128/53 | 1001 | 243/117 | 100.1 | 4 | 36/91 | 1.5/3.8 | 220/104 | 15.5 |
| E | 4.62 | 127/53 | 1117 | 243/117 | 0 | 3 | 26/66 | 2/5.1 | 220/104 | 15.5 |
| 3 | 4.62 | 126/52 | 1117 | 242/117 | 50.2 | 4 | 36/91 | 1.5/3.8 | 220/104 | 15.5 |
| 4 | 4.61 | 125/52 | 1109 | 242/117 | 100.4 | 4 | 36/91 | 1.5/3.8 | 220/104 | 15.5 |
| 5 | 4.15 | 123/51 | 850 | 240/116 | 63.5 | 3 | 26/66 | 2/5.1 | 220/104 | 15.5 |
| 6 | 4.15 | 121/49 | 710 | 240/116 | 99.82 | 3 | 26/66 | 2/5.1 | 220/104 | 15.5 |
| 7-1 | 4.15 | 119/48 | 710 | 240/116 | 87.12 | 3 | 26/66 | 2/5.1 | 220/104 | 15.5 |
| 7-2 | 4.15 | 123/51 | 710 | 233/112 | 88.04 | 3 | 26/66 | 2/5.1 | 220/104 | 15.5 |
| 8 | 4.15 | 123/51 | 800 | 241/116 | 62.88 | 3 | 26/66 | 2/5.1 | 220/104 | 15.5 |
| 9-1 | 4.15 | 135/57 | 640 | 239115 | 126.02 | 3 | 26/66 | 2/5.1 | 220/104 | 15.5 |
| 9-2 | 4.15 | 140/60 | 640 | 237/114 | 125.15 | 4 | 34/36 | 1.25/3.2 | 220/104 | 15.5 |

The following Table compares calculated density with actual top pad density for the prepolymer formulations containing controlled amounts of unreacted NCO. Predicted density and actual top pad density begin to deviate more significantly for comparative examples C-2 and C-3 that use an all TDI, high percent unreacted NCO prepolymer and a large mold diameter—all factors tending to increase product non-uniformity.

TABLE 4

Density Variation

| Formulation | Unreacted NCO Wt. % | Microsphere Wt. % | Theor Vol/g Urethane | Theor Vol/g Microsphere | Theor Vol/g Mixture | Predicted Density g/cc | Actual Top Pad Density g/cc |
|---|---|---|---|---|---|---|---|
| A-1 | 9.11 | 1.78 | 0.843 | 0.413 | 1.256 | 0.796 | 0.790 |
| A-2 | 9.11 | 0.00 | 0.858 | 0.000 | 0.858 | 1.165 | 1.165 |
| B-1 | 9.11 | 1.58 | 0.843 | 0.366 | 1.209 | 0.827 | 0.826 |
| B-2 | 9.11 | 2.10 | 0.838 | 0.487 | 1.325 | 0.755 | 0.734 |
| B-3 | 9.11 | 1.56 | 0.843 | 0.363 | 1.206 | 0.829 | 0.826 |
| B-4 | 9.11 | 0.00 | 0.856 | 0.000 | 0.856 | 1.168 | 1.168 |
| B-5 | 9.11 | 1.58 | 0.843 | 0.368 | 1.210 | 0.826 | 0.827 |
| C-1 | 9.02 | 0 | 0.841 | 0.000 | 0.841 | 1.189 | 1.189 |
| C-2 | 9.02 | 0.89 | 0.833 | 0.211 | 1.045 | 0.957 | 0.895 |
| C-3 | 9.02 | 1.71 | 0.827 | 0.407 | 1.233 | 0.811 | 0.727 |
| D | 7.12 | 0 | 0.856 | 0.000 | 0.856 | 1.169 | 1.169 |
| 1 | 7.12 | 0.88 | 0.848 | 0.210 | 1.058 | 0.945 | 0.955 |
| 2 | 7.12 | 1.75 | 0.841 | 0.417 | 1.257 | 0.795 | 0.794 |
| E | 8.13 | 0 | 0.836 | 0.000 | 0.836 | 1.196 | 1.196 |
| 3 | 8.13 | 0.87 | 0.829 | 0.207 | 1.035 | 0.966 | 0.946 |
| 4 | 8.13 | 1.73 | 0.822 | 0.411 | 1.233 | 0.811 | 0.783 |
| 5 | 7.18 | 1.25 | 0.845 | 0.292 | 1.137 | 0.880 | 0.880 |
| 6 | 5.99 | 2.01 | 0.839 | 0.479 | 1.318 | 0.759 | 0.795 |
| 7-1 | 5.99 | 1.76 | 0.841 | 0.294 | 1.134 | 0.882 | 0.874 |
| 7-2 | 5.99 | 1.78 | 0.841 | 0.324 | 1.164 | 0.859 | 0.837 |
| 8 | 5.75 | 1.25 | 0.859 | 0.291 | 1.150 | 0.870 | 0.871 |
| 9-1 | 5.4 | 2.56 | 0.755 | 0.427 | 1.183 | 0.846 | 0.841 |
| 9-2 | 5.3 | 2.55 | 0.755 | 0.417 | 1.173 | 0.853 | 0.852 |

The formulation 8 calculation uses Uniroyal's Adiprene LFG963A S.G. of 1.15 for unfilled material
The formulation 9 calculation uses Uniroyal's Adiprene LF1950A S.G. of 1.29 for unfilled material Table 4 shows a general correlation between top pad density and the predicted pad density.

Table 5 contains the maximum exotherm temperature obtained for casting each polyurethane cake.

TABLE 5

Maximum Exotherm Temperature

| Formulation | Unreacted NCO Wt % | Exotherm max, °F. | Exotherm max, °C. |
|---|---|---|---|
| B-1 | 9.11 | 257 | 125 |
| B-5 | 9.11 | 258 | 126 |
| 5 | 7.18 | 235 | 113 |
| 6 | 5.99 | 215 | 102 |
| 7-2 | 5.99 | 209 | 98 |
| 8 | 5.75 | 163 | 73 |
| 9-1 | 5.4 | 230 | 110 |

The above Table illustrates that controlling the unreacted NCO to less than 9.1 facilitates limiting the exotherm temperature to below 120° C.

A series of density measurements taken from top, middle and bottom pads compared through-cake uniformity of 80 mil (2 mm) polishing pads. The average density represents the center, edge and midpoint density for pads from the three cake locations. In addition, the center, edge and midpoint densities represent the average of four measurements.

TABLE 6

Density Uniformity

| Formulation | Unreacted NCO Wt. % | Microspheres Wt. % | Exotherm max, °F. | Exotherm max, °C. | Avg Density through Cake g/cc | St Dev | Cake Diameter, in./cm |
|---|---|---|---|---|---|---|---|
| A-1 | 9.11 | 1.78 | ND | ND | 0.785 | 0.020 | 26/66 |
| B-1 | 9.11 | 1.58 | 257 | 125 | 0.818 | 0.012 | 26/66 |
| B-2 | 9.11 | 2.10 | ND | ND | 0.741 | 0.030 | 36/91 |
| 5 | 7.18 | 1.25 | 235 | 113 | 0.877* | 0.003 | 26/66 |
| 6 | 5.99 | 2.01 | 215 | 102 | 0.781 | 0.006 | 26/66 |
| 8 | 5.75 | 1.25 | 163 | 73 | 0.865 | 0.010 | 26/66 |

ND = Not Determined
*Determined by measuring entire pads through the cake.

These data indicate that an unreacted NCO range can improve the density standard deviation for cast polishing pads.

Because the amount of pad material contacting the surface to be polished is related to the density of the pad material, polishing performance measures such as removal rates and topographical control are expected to be greatly influenced by the density of a particular formulation. As control of polishing performance is driven to ever tighter requirements by smaller linewidths and more fragile wafer materials, the importance of improving the control of pad characteristics becomes increasingly important. The porous-polyurethane polishing pads cast with a prepolymer having a controlled amount of unreacted NCO show a smaller standard deviation for density measurements both across a pad and through a cake.

The invention claimed is:

1. A method of forming a polishing pad suitable for planarizing semiconductor substrates comprising the steps of:
    casting polyurethane polymeric material, a curative agent and expandable polymeric microspheres in a mold of a cake, the polyurethane polymeric material being from a prepolymer reaction of a prepolymer polyol and a polyfunctional aromatic isocyanate to form an isocyanate-terminated reaction product, the polyfunctional aromatic isocyanate having less than 1 weight percent aliphatic isocyanate and less than 0.5 weight percent free isocyanate monomer, the isocyanate-terminated reaction product having 4.5 to 8.7 weight percent unreacted NCO and an OH or $NH_2$ to unreacted NCO stoichiometric ratio of 80 to 110 percent, and the expandable polymeric microspheres containing pre-expanded or expanded in situ microspheres;
    gelling the isocyanate-terminated reaction product with a gel time sufficient to control porosity distribution from the expandable polymeric microspheres in the mold;
    limiting exotherm of the cast isocyanate-terminated reaction product to a temperature below 120° C. to control density uniformity of the expandable polymeric microspheres within polishing pads from the cake and maintain average volume of the expandable polymeric microspheres in the polishing pads within 7 percent of average volume of the expandable polymeric microspheres before casting;
    curing the gelled isocyanate-terminated reaction product with the curative agent and the expandable polymeric microspheres within the isocyanate-terminated reaction product to form the cake, the curative agent being selected from the group comprising curative polyamines, curative polyols, curative alcoholamines and mixtures thereof; and
    skiving the cake to form the polishing pads; and the polishing pads containing a porosity of 0.1 to 70 volume percent from the expandable polymeric microspheres, the expandable polymeric microspheres having a weight average diameter of 10 to 100 μm and the polishing pads having a density of 0.6 to 1.15 g/cm³.

2. The method of claim 1 wherein the polishing pads include the expandable polymeric microspheres having a concentration of 0.25 to 60 volume percent and the expandable polymeric microspheres are pre-expanded.

3. The method of claim 1 wherein the polishing pads include the expandable polymeric microspheres having a weight average diameter of 15 to 50 μm.

4. A method of forming a polishing pad suitable for planarizing semiconductor substrates comprising the steps of:
    casting polyurethane polymeric material, a curative agent and expandable polymeric microspheres in a mold of a cake, the polyurethane polymeric material being from a prepolymer reaction of a prepolymer polyol and a polyfunctional aromatic isocyanate to form an isocyanate-terminated reaction product, the polyfunctional aromatic isocyanate having less than 1 weight percent aliphatic isocyanate and less than 0.5 weight percent free isocyanate monomer, the isocyanate-terminated reaction product having 4.5 to 8.7 weight percent unreacted NCO and an OH or $NH_2$ to unreacted NCO stoichiometric ratio of 80 to 110 percent, and the expandable polymeric microspheres containing pre-expanded or expanded in situ microspheres;
    gelling the isocyanate-terminated reaction product with a gel time sufficient to control porosity distribution from the expandable polymeric microspheres in the mold;
    limiting exotherm of the cast isocyanate-terminated reaction product to a temperature below 120° C. to control density uniformity of the expandable polymeric microspheres within the mold of the cake and maintain average volume of expandable polymeric microspheres in polishing pads from the cake to a volume within 7 percent of average volume of the expandable polymeric microspheres before casting;
    curing the gelled isocyanate-terminated reaction product with the curative agent and the expandable polymeric microspheres within the isocyanate-terminated reaction product to form the cake, the curative agent being selected from the group comprising curative polyamines, curative polyols, curative alcoholamines and mixtures thereof; and
    skiving the cake to form the polishing pads; and the polishing pads containing a porosity of 0.1 to 70 volume percent from the expandable polymeric microspheres, the expandable polymeric microspheres having a weight average diameter of 10 to 50 μm and the polishing pads having a density of 0.6 to 1.15 g/cm³.

5. The method of claim 4 wherein the polishing pad includes the expandable polymeric microspheres having a concentration of 0.25 to 60 volume percent and the expandable polymeric microspheres are pre-expanded.

6. The method of claim 4 wherein the polishing pad includes the expandable polymeric microspheres having a weight average diameter of 15 to 50 μm.

* * * * *

UNITED STATES PATENT AND TRADEMARK OFFICE
CERTIFICATE OF CORRECTION

| | |
|---|---|
| PATENT NO. | : 7,414,080 B2 |
| APPLICATION NO. | : 11/036285 |
| DATED | : August 19, 2008 |
| INVENTOR(S) | : Kulp |

It is certified that error appears in the above-identified patent and that said Letters Patent is hereby corrected as shown below:

Title page, Item (73) Assignee, should read as follows:
--Rohm and Haas Electronic Materials CMP Holdings, Inc.,--

Signed and Sealed this

Second Day of June, 2009

JOHN DOLL
*Acting Director of the United States Patent and Trademark Office*